United States Patent [19]

Spector

[11] Patent Number: 5,176,224
[45] Date of Patent: Jan. 5, 1993

[54] COMPUTER-CONTROLLED SYSTEM INCLUDING A PRINTER-DISPENSER FOR MERCHANDISE COUPONS

[76] Inventor: Donald Spector, 380 Mountain Rd., Union City, N.J. 07087

[21] Appl. No.: 413,966

[22] Filed: Sep. 28, 1989

[51] Int. Cl.⁵ ............................................. A47F 10/02
[52] U.S. Cl. ..................................... 186/52; 235/383
[58] Field of Search .............. 186/52; 221/2; 235/381, 235/383, 385; 364/405, 479

[56] References Cited

U.S. PATENT DOCUMENTS

| | | | |
|---|---|---|---|
| 3,959,624 | 5/1976 | Kaslow | 235/487 X |
| 4,124,109 | 11/1978 | Bissell et al. | 194/210 |
| 4,554,446 | 11/1985 | Murphy et al. | 235/385 X |
| 4,833,308 | 5/1989 | Humble | 235/383 |
| 4,896,791 | 1/1990 | Smith | 364/479 X |

*Primary Examiner*—F. J. Bartuska
*Attorney, Agent, or Firm*—Michael Ebert

[57] ABSTRACT

A closed-loop computer-controlled merchandising coupon system which includes a coupon printer-dispenser installed at each supermarket, making it possible for a shopper to receive a merchandising coupon entitling him to a specified discount on the product identified in the coupon. The printer, which is computer-controlled, is linked to at least one manufacturer whose product is available in the supermarket, the manufacturer instructing the printer as to the data to be printed. The printer, when actuated by the shopper, prints on a universal coupon blank the identity of the manufacturer's product and the discount to which the holder is entitled as then determined by the manufacturer, the printed coupon then being dispensed. When the shopper purchases this product and redeems the coupon at a checkout counter at the supermarket, he is accorded the specified discount. Checkout counters at the supermarkets having coupon dispenser installations are linked to each manufacturer, thereby completing the loop, the manufacturer being provided with a readout of discount coupon transactions so that on the basis of this readout, he can alter the discount amount to be printed on the blank coupon.

4 Claims, 1 Drawing Sheet

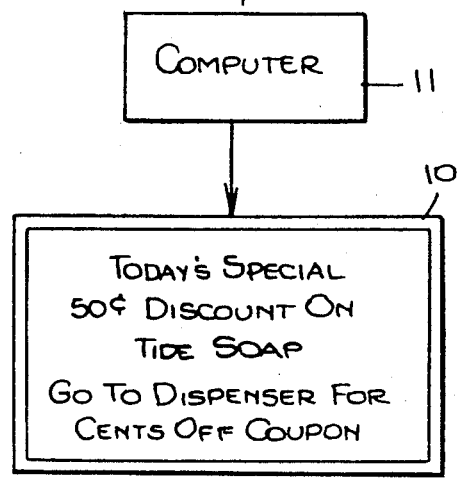
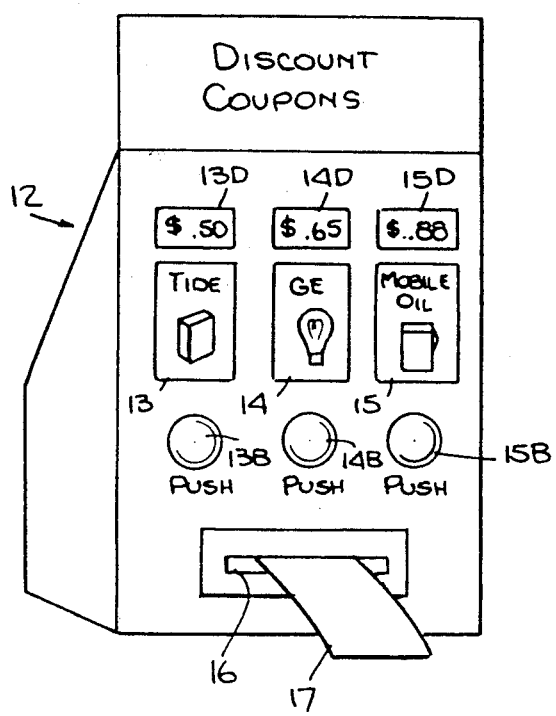
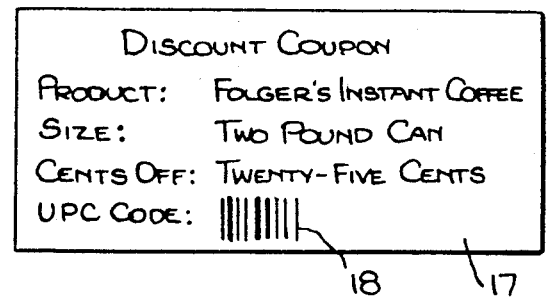
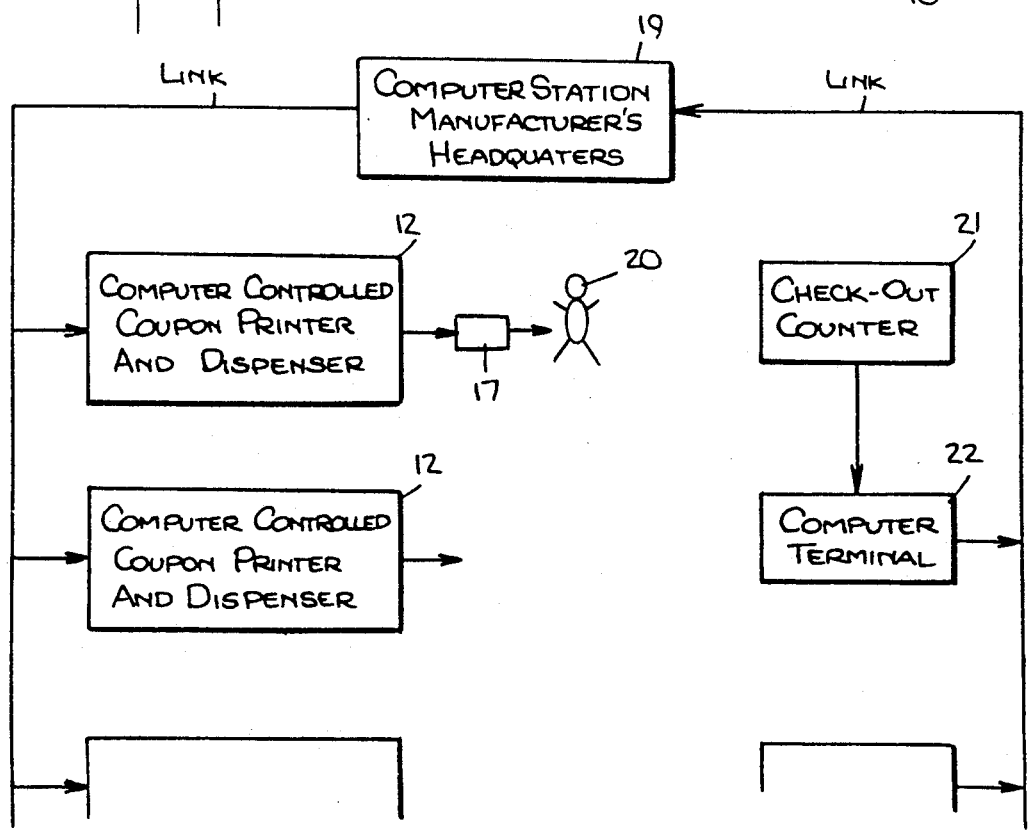

COMPUTER-CONTROLLED SYSTEM INCLUDING A PRINTER-DISPENSER FOR MERCHANDISE COUPONS

BACKGROUND OF INVENTION

1. Field of Invention

This invention relates generally to systems for processing merchandising coupons which, when presented at a checkout counter in a retail store, entitle a customer to specified discounts on those purchased items identified by the coupons, and more particularly to a computer-controlled system in which a universal coupon blank is printed in dispensers at supermarket sites to provide discount coupons for particular products, making it possible for shoppers to receive, on demand, discount coupons on available items of merchandise.

2. Status of Prior Art

A merchandising coupon is often referred to as a "cents-off" or discount coupon; for the holder of the coupon, when purchasing the product identified on the coupon from the retailer, is given a specified discount. Such coupons fall into two basic classes—those printed and put into distribution by manufacturers, and those which retailers print for use in their stores.

The majority of merchandising coupons are authorized by the manufacturer of the product so that the manufacturer is required to pay to the retailer the face value of each coupon redeemed, plus certain handling charges. For example, on occasion the Coca-Cola Company runs ads which include a coupon offering 25c towards the purchase of a pack of "Coca-Cola" bottles. The retailer who accepts this coupon gives the purchaser of the pack a 25¢ reduction on the market price thereof. The retailer is then entitled to recover from the Coca-Cola Company this 25¢ discount, plus seven cents for handling costs (or whatever other handling charge is indicated).

Despite the high cost of merchandising coupon transactions, the volume of coupon traffic has risen over the years to a phenomenal level. Thus in 1978, manufacturers distributed about 72 billion coupons, whereas in 1982, it amounted to almost 120 billion, and currently the amount is much higher. Though only a fraction of the many billions of coupons which are distributed are actually put to use by shoppers, the number of coupons which are redeemed still runs into the billions.

Experience has shown that cents-off coupons constitute a cost-effective promotional technique for stimulating consumers to try out a new product or to switch brands. Moreover, when sales of a given brand are flagging, discount coupons often serve to revive and even increase such sales. Discount coupons therefore benefit the consumer, the manufacturer and the retailer. According to an article which appeared in the Jun. 13, 1983 issue of Business Week, cents-off coupons appear to be a more effective marketing tool for stepping up sales than expensive TV commercials.

While in some instances coupons accepted by the retailer are redeemed by sending them directly back to the company making the product, most coupons first go through a clearing house where, after the coupons have been manually sorted, they are shipped by the clearing house to the respective manufacturers who then invoice the money payable to the clearing house.

With existing procedures, the manufacturer has little control over the number of coupons redeemed. By statistical analysis of previous coupon promotions, the manufacturer can make a projection of anticipated redemptions. However, if a coupons was issued for a larger than usual discount and the redemption rate was higher than expected, the manufacturer may then incur a greater promotional expense than he projected.

Also, with the existing procedures, the time elapsing between issuance and redemption of a coupon can be many months, particularly if the coupon carries an expiration date which gives the shopper a long term in which to use the coupon. This makes planning for future promotions difficult, for information on coupon redemptions in previous promotions is slow to arrive.

Quite distinct from these problems is the failure of many shoppers to take advantage of discount coupons. While a shopper may save coupons mailed to him or may clip and file coupons appearing in newspapers and magazines, he often forgets to take them along when going shopping and therefore will not be induced to make a discretionary purchase or switch brands. Typically, a consumer will receive in the mail a discount coupon , say, for a new hair shampoo; but it will be several days before his next shopping trip, and by that time he may have forgotten about the coupon and will therefore purchase his usual undiscounted brand.

To overcome this drawback, the patent to Bissell et al., U.S. Pat. No. 4,124,109, discloses a coupon dispenser that can be installed in a supermarket and which dispenses a packet of printed discount coupons. In this dispenser, a packet is dispensed in response to a depositor who inserts a coin in a coin receptacle.

Existing merchandise coupons are printed on various types of paper or card stock in different sizes, shapes and formats. This makes it necessary for retail store employees, in order to avoid costly errors, to give each coupon careful handling. This handling would be greatly simplified if all coupons, regardless of their source, were in a single, standardized format.

Another difficulty experienced with standard merchandising coupons is that they are not compatible with modern supermarket computerized checkout systems which utilize the universal product code (UPC). To appreciate this difficulty, one must bear in mind that in less than fifty years, the grocery industry has evolved from one characterized by small neighborhood stores to an industrial giant with many supermarkets, and that the variety of foods and household goods now available to the consumer in many supermarkets has grown from less than 3,000 items in 1946 to well over 10,000 items.

The UPC system is designed to cope not only with the problem of efficiently and accurately handling the enormous number of items sold in a modern supermarket, but also with the matter of pricing these items. In this system, instead of marking each item of merchandise with its selling price and revising the marking on the box or container every time a price change is made, the item only carries a symbol in the form of code indicia. At the checkout counter, the symbols appearing on the items purchased by the consumer are examined by an optical scanner whose output signal identifies each item as it is pulled across the scanner. The signal is sent to a computer terminal that automatically retrieves the item's name and price from a memory bank which is readily updated.

The terminal then displays a description of the item and its price, and it performs all of the calculations necessary for tax and change. The terminal prints a customer receipt listing and identifying all of the items purchased. giving the prices of items and the total amount to be paid.

Thus personnel at the checkout counter are relieved of the need to read the price appearing on the item and are not required with the UPC marked items to operate the keyboard on a register to enter the price of the items purchased. for these functions are carried out automatically by the system. But when the customer presents to a clerk at the checkout counter a "cents-off" coupon, then the existing UPC system is incapable of coping automatically with this transaction.

It is for this reason that existing UPC systems, such as the IBM 3660 supermarket system, are provided with a manually-operated digital keyboard functioning in conjunction with a mode keyboard. On the mode keyboard, separate keys exist for food stamps, refunds and other special situations, as well as for store merchandising coupons and manufacturers' merchandising coupons.

When a customer presents a manufacturer "cents-off" coupons. the clerk has to press the manufacturer's coupon key on the mode keyboard, after which he is required to key in the amount of the discount on the digital keyboard. so that a proper discount is accorded to the customer by the terminal. The discount is printed at the terminal and appears on the receipt.

This procedure for merchandising coupons is obviously time-consuming and subject to human error, and since, as explained previously, the current volume of merchandising coupons being traded is enormous. the productivity of the UPC system is materially impaired by the need to manually process such coupons. Moreover, the problem of misredemption is not alleviated by existing UPC systems, for the system honors these coupons, whether or not a purchase is made.

In the patent to Kaslow, U.S. Pat. No. 3,959,624, in order to expedite the handling of discount coupons, a UPC symbol is printed on each coupon which corresponds to the UPC symbol appearing on the product being discounted. The coupon also has printed thereon a symbol indicating that it is a coupon and not an item of merchandise. At the UPC checkout counter at the supermarket, first the UPC symbols on the items purchased are scanned and the coded information derived therefrom is stored. Then the discount coupons presented by the shopper are optically scanned and the coded information derived therefrom is checked in the terminal against the stored coded information taken from the purchased items. Only if a match is found is the customer granted the discount.

A coupon system in accordance with the invention is compatible with that disclosed in the Kaslow patent; and while the present system does not require UPC symbols to carry out its function, the coupons printed by the present system may also have UPC symbols impressed thereon for use in supermarkets which have UPC checkout terminals.

The present invention takes advantage of recent innovations in merchandising technology which make use of electronic signs installed at retail establishments including supermarkets, the signs being linked by satellite or cable to a remote computer. With this arrangement, a manufacturer who wishes to promote a particular product can buy display time on the signs in thousands of supermarkets to inform shoppers that his product, say CREST toothpaste is on sale today at $1.99.

But in order to make this purchase, the shopper must have the appropriate discount coupon, and the printing and distribution of such coupons takes weeks to implement. Moreover, in order for the manufacturer to know whether his discount coupon has been effective, it may take several weeks before he is fully informed as to the number of discount coupons that have been redeemed.

The competition for shelf space in high volume supermarkets which carry thousands of items is intense, and if a particular product is selling poorly, it will be supplanted by merchandise that sells better. With well known brands having an assured demand, this is no great problem, but if a manufacturer induces a supermarket to give shelf space to a newly-introduced product for which there is no established demand, he runs the risk that the product will be pulled by the retailer from the shelf should it fail to sell well.

It is desirable, therefore, that if a new product is being heavily promoted by way of discount coupons, that these coupons be made directly available to shoppers at the supermarket, for most shopper decisions are made at a point of purchase, not when the shopper sees a coupon in a magazine or newspaper. Also desirable is that the manufacturer be advised on-line, as it were, in regard to the volume of sales of a particular discounted item, for then should the volume be disappointing, he can further mark down the item by increasing the discount, or should the volume be greater than anticipated, he can decrease the discount. Existing discount coupon practices do not satisfy this requirement and are relatively inflexible.

SUMMARY OF INVENTION

In view of the foregoing, the main object of this invention is to provide a computer-controlled system which includes a computer-operated printer-dispenser installed at each supermarket whereby a universal coupon blank can, on demand, be printed and dispensed to create a discount coupon for a particular product, making it possible to shoppers to receive and redeem discount coupons on available items of merchandise.

A salient feature of a system in accordance with the invention is that the coupon printer-dispenser at each supermarket is linked by satellite or other means to a computer station at the headquarters of the manufacturer for a particular product, and the discount amount to be printed on the coupon is determined at headquarters and can be changed in keeping with promotional requirements.

Also an object of this invention is to provided a closed loop interactive system of the above type in which the volume of coupon redemption transactions which take place at each supermarket is transmitted to the manufacturer's headquarters, from which volume the manufacturer can evaluate the effectiveness of his promotional campaign.

A significant advantage of a closed loop system in accordance with the invention is that it is possible for the manufacturer to evaluate the effect of specific discount amounts on shoppers and to tailor the discount accorded a particular product so as best to promote the sale of the product.

Yet another object of the invention is to provide discount coupons with UPC bar code indicia so that when a coupon is redeemed, data as to the transaction can be recorded at a supermarket computer terminal in digital terms and can also be transmitted to the manufacturer's headquarters.

Briefly stated, these objects are attained in a closed-loop computer-controlled merchandising coupon system which includes a coupon printer-dispenser installed at each supermarket. making it possible for a shopper to receive a merchandising coupon entitling him to a specified discount on the product identified in the coupon. The printer, which is computer-controlled, is linked to at least one manufacturer whose product is available in the supermarket, the manufacturer instructing the printer as to the data to be printed. The printer, when actuated by the shopper, prints on a universal coupon blank the identity of the manufacturer's product and the discount to which the holder is entitled as then determined by the manufacturer, the printed coupon then being dispensed. When the shopper purchases this product and redeems the coupon at a checkout counter at the supermarket, he is accorded the specified discount. Checkout counters at the supermarkets having coupon dispenser installations are linked to each manufacturer, thereby completing the loop, the manufacturer being provided with a readout of discount coupon transactions so that on the basis of this readout, he can alter the discount amount to be printed on the blank coupon.

BRIEF DESCRIPTION OF DRAWINGS

For a better understanding of the invention as well as other objects and further features thereof. reference is made to the following detailed description to be read in conjunction with the accompanying drawings, wherein:

FIG. 1 shows an electronic sign installed at a supermarket calling attention to a sale of a particular product;

FIG. 2 shows in perspective the computer-controlled coupon printer and dispenser included in a system in accordance with the invention;

FIG. 3 is a sample of a universal coupon blank after it is printed to provide a discount coupon for a particular product; and FIG. 4 is a block diagram of a system in accordance with the invention.

DESCRIPTION OF INVENTION

We shall assume for purposes of explaining the invention in simple terms that the product to be promoted in a chain of supermarkets is TIDE soap, and that in each of the markets, an electronic sign 10, as shown in FIG. 1, is set up near the entrance so that it is visible to all shoppers entering the store.

Sign 10, which may be in LED, LCD, video or any other controllable form, is linked by satellite, cable, telephone or any other means to a remote control terminal or computer which is adapted to cause the sign to display any desired message which in the example shown is—50¢ Discount on TIDE soap—Go to Dispenser for Cents'-Off Coupon—.

A shopper who wishes to obtain this discount then goes to a discount coupon printer-dispenser 12, as shown in FIG. 2, installed at a site in the supermarket that is near the sign. In the example shown, on the front panel of dispenser 12 is a set of three LCD or LED controllable displays which are coupled to an internal microprocessor which in this instance is dedicated to the sign. The microprocessor includes a CPU, ROMS and other computer components and has stored in its memory in digital form, the images of the various items in the supermarket which are subject to discount. Hence it is a relatively easy matter to instruct the microprocessor to cause the displays 13, 14, and 15 to show the products being discounted on a particular day.

We shall assume that on a given day, selected for presentation on displays 13, 14 and 15 are Tide Soap, a GE electric lamp and a can of Mobil Oil, images of these products being shown. Placed above displays 13, 14 and 15 on the front panel are LCD or LED displays 13D, 14D and 15D which specify the cents-off discount for the items shown below; in this instance, the amounts being 50¢, 65¢ and 88¢, respectively.

Placed below displays 13, 14 and 15 on the front panel of the dispenser are push buttons 13B, 14B and 15B, the arrangement being such that when a selected button is depressed, the dispenser through a slot 16 then discharges a discount coupon 17.

Discount coupon 17 is derived from a stack of universal coupon blanks stored in the dispenser having, as shown in FIG. 3, pre-printed thereon PRODUCT, SIZE, CENTS'-OFF and UPC code, so that the same pre-printed blank can be used regardless of the product to be discounted and the amount of the discount.

Printer-dispenser 12 is provided with a computer-controlled printer which may be of the laser, the ink jet or any other type used in conjunction with a standard word processor, so that one can fill in the blanks on the universal coupon with the required data. In the example shown, the blank coupon has printed thereon FOLGER'S INSTANT COFFEE as the product, a two pound can as the size, and 25¢ as the discount.

Also printed on the universal blank is the UPC code bars 18 indicative of the manufacturer, the product and the amount of the discount. When, therefore, this coupon is redeemed at a supermarket checkout counter, the UPC code is scanned to provide in digital data in regard to this transaction.

In practice, rather than individual universal blanks, the blanks may appear serially on a paper roll which is drawn through the printer and then cut to provide a single discount coupon which is dispensed.

As shown in FIG. 4, in a system in accordance with the invention the computer-controlled coupon printer-dispensers 12 installed in a chain of supermarkets are all linked by satellite, cable, telephone or other means to a computer station 19 at the headquarters of a manufacturer who wishes to provide shoppers with discount coupons 17 on a particular product giving the purchaser a specified discount.

In this system, the discount to be accorded is determined not long in advance of a sale, as in prior practice, but on the day of the sale when an announcement of the sale appears on electronic sign 10. The typical manufacturer of products which are sold in supermarkets has a line of diverse products, and what he instructs dispenser 12 is which product identification and size to print and also the discount to be accorded this product. The shopper 20 then takes the printed coupon 17 and goes to a shelf to remove the product therefrom. He puts the product in his shopping cart along with other products to be purchased.

At the checkout counter, the store clerk not only scans on a reader the UPC code on the purchased product subject to discount, but he also scans the UPC code on the machine-readable discount coupon to record in a local computer terminal 22 associated with the checkout counter the discount given to the product.

The data regarding coupon discount transactions which are entered into computer terminal 22 are transmitted by a satellite, cable, telephone or other link to computer station 19 at the manufacturer's headquarters, thereby closing the loop.

Thus at headquarters, one is able not only to instruct the printer-dispenser 12 what coupons to print and the discount to be given the product on sale, but also to see and evaluate the reaction to the sale, for headquarters is informed as to the volume of coupon transactions in all supermarkets included in the system. And headquarters can on the basis of incoming information raise or lower the discount being given so as to best promote a given product without unduly lowering its price. Hence in this system, the manufacturer interacts with the retail operation, and both the manufacturer and the retailer benefit from this interaction.

A great advantage of the present invention over existing discount coupon procedures is that it does away with the need to print and distribute billions of coupons in the hope that a percentage will be put to use; for with the invention, it is only when a shopper intends to use a discount coupon that one is printed, and this only happens when the shopper has already decided to purchase the product.

All of the elements which together make up the system are known, per se, and are commercially available, such as computer-controlled printers, coupon dispenser, LCD or LED displays and electronic signs.

While there has been shown and described a preferred embodiment of a computer-controlled system for merchandise coupons in accordance with the invention, it will be appreciated that many changes and modifications may be made therein without, however, departing from the essential spirit thereof. Thus should a supermarket lack a UPC system, then the information entered into the register at the checkout counter regarding discount coupon transactions is transmitted to the manufacturer's headquarters.

In practice the control of the printer-dispenser to instruct the printer what to print is not limited to a manufacturer's headquarters operation, for in some instances, it may be desirable for a distributor of a given product or a retailer to effect such control from an appropriate station. It is also to be understood that a system in accordance with the invention is not limited to supermarket operations, for it is applicable to any retail operation, such as drugstores or stores specializing in cosmetics.

The interaction between headquarters and the printer-dispenser to promote a given product may be carried out without human intervention by means of a software program. In response to a varying volume of sales of a given discounted product at supermarkets or other retail establishments reported back to the computer at headquarters or any other station, the software program is such as to instruct the dispenser-printer to increase or decrease the discount accorded to this product so as to induce at the retail establishment an increase or decrease in the volume of sales to attain a desired sales volume level.

A conventional discount coupon carries a long term expiration date which usually gives the consumer several weeks to redeem it, for there may be a relatively prolonged interval between the time when the coupon which is included in, say, a magazine, is published and distributed, and the time when the consumer receives the coupon and decides to redeem it.

But in a system in accordance with the invention, the discount coupon printed and dispensed at a retail site is intended to be used shortly thereafter, for the program which governs the printing of coupons may be such as to change in the course of a day, the amount of the discount to be accorded a given product, or even to withdraw the discount. Hence the system dictates a short term cents-off coupon, and for this purpose, the printer must also print in the coupon blank an expiration date and time, say, "Expiration: Oct. 5, 1989—3 PM" so that the coupon can only be redeemed shortly after it is dispensed. In practice, this expiration date and time can be included in the machine-readable UPC bar code printed on the coupon, so that the coupon, when scanned at the checkout counter, will automatically be rejected should it have expired.

I claim:

1. A merchandising system for supermarkets or other retail establishment comprising:
   (a) a printer-dispenser installed at each supermarket serviced by the system, making it possible for a shopper to receive a coupon entitling him to a discount on a particular manufacturer's product on sale at that market, the printer being computer-controllable and being adapted, when actuated by the shopper, to print on a universal coupon blank the identity of the product and the discount to which its purchaser is entitled, thereby providing a printed discount coupon which is discharged from the dispenser, said computer-controllable printer including a panel having a set of manufacturer-controllable electronic displays thereon adapted to selectively display any desired message to identify the respective products for which discount coupons are available, and a corresponding set of controllable electronic displays to indicate the discount accorded to each product, said panel including a corresponding set of push-buttons, each of which when actuated by the shopper, causes the printer to print a discount coupon for the related product, and causes the dispenser to discharge the printer coupon;
   (b) computer means remotely controllable by the manufacturer having an interest in promoting the product and coupled to the printer to instruct the printer to print on the coupon blank the identity of the product and to print the amount of the discount; and
   (c) an electronic sign adapted to selectively display any desired message installed in the supermarket and under the remote control of the manufacturer to announce to shoppers entering the supermarket that the product is on sale and that discount coupons therefor are obtainable from the printer-dispenser.

2. A system as set forth in claim 1, wherein said printer is adapted to print on the coupon a UPC symbol that identifies in bar code form the manufacturer and the manufacturer's product subject to discount, and also the specified discount.

3. A system as set forth in claim 1, wherein said computer means is installed at the headquarters of the manufacturer and is linked by satellite to the printer.

4. A system as set forth in claim 1, further including means in the supermarket to derive at a checkout counter where the product is purchased information regarding each discount coupon transaction and to transmit this information to the computer means and headquarters whereby headquarters can then evaluate the volume of the transactions, and as a result change the discount to be printed.

* * * * *